Nov. 17, 1970 W. S. PETERSON 3,540,316
HOT FORGED DIE BLANKS AND METHODS OF MAKING THE SAME
Original Filed Feb. 28, 1967 3 Sheets-Sheet 1
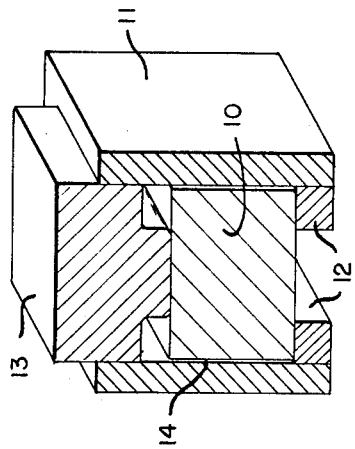
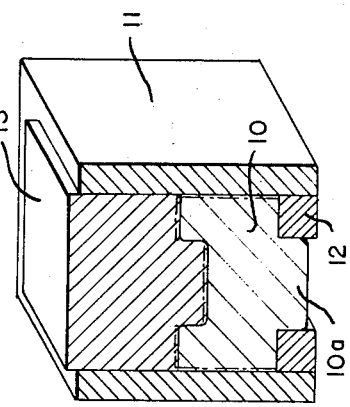
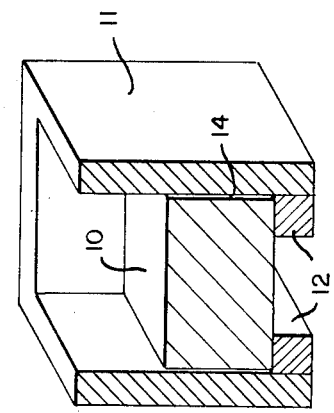
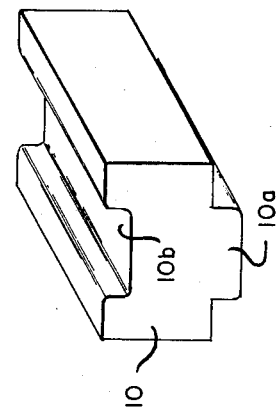
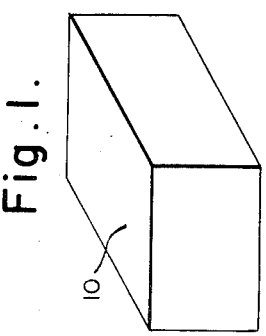
INVENTOR
Willis S. Peterson
his attorneys Nov. 17, 1970  W. S. PETERSON  3,540,316
HOT FORGED DIE BLANKS AND METHODS OF MAKING THE SAME
Original Filed Feb. 28, 1967  3 Sheets-Sheet 2
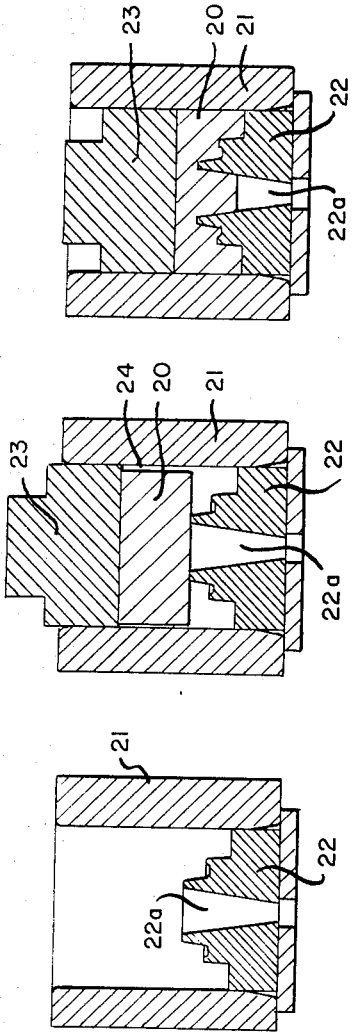
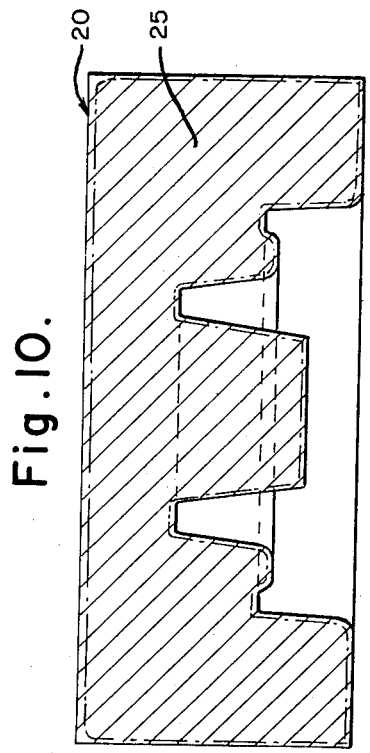
INVENTOR
Willis S. Peterson INVENTOR
Willis S. Peterson

United States Patent Office 3,540,316
Patented Nov. 17, 1970

3,540,316
HOT FORGED DIE BLANKS AND METHODS OF MAKING THE SAME
Willis S. Peterson, Pittsburgh, Pa., assignor to Heppenstall Company, a corporation of Pennsylvania
Continuation of application Ser. No. 619,315, Feb. 28, 1967. This application Oct. 14, 1969, Ser. No. 868,975
Int. Cl. B21k 5/20
U.S. Cl. 76—107                               3 Claims

ABSTRACT OF THE DISCLOSURE

A method and apparatus for hot forging die blanks in which a die block is formed having a volume equal to the final volume of the finished forged die block and dimension such that during pressing all work in the direction of pressing is completed before completion of movement of the block transverse to the direction of pressing, heating the block to forging temperature and pressing the block in a closed die to form a desired configuration thereon, thereafter further pressing the block to cause it to move in a direction transverse to the movement of the press to engage the side wall of the die and removing the completed forged die block.

---

This application is a continuation of my co-pending application Ser. No. 619,315 filed Feb. 28, 1967 now abandoned.

This invention relates to hot forged die blanks and methods of making the same and particularly to a hot forged die blank having the proximate final die shape in a hot forged blank and to a method for making such a blank.

The present practice in the manufacture of dies, which is the practice that has been used for years, consists in taking a blank of heat-treated steel of desired thickness and to cut from this blank, by machining or the like, the desired cavity in the die and thereafter attach a shank. Such die blanks have generally been furnished to die makers in the heat-treated state because once the blanks leave the forge shop, the subsequent processors do not have facilities to heat treat. The problems with this prior art practice were well known. First, there was a great deal of work to be done in the machining of the die blank into the final die shape. Second, the heat treatment was not consistently held throughout the larger die blocks. Third, the desired fine grained condition of the outer surface areas of the steel die was lost at the cut out area and the grain contour of the steel became discontinuous by reason of the machining.

Many attempts have been made to forge a die block having the desired generally preformed cavity of the final forged die but without success. Many problems have been encountered. One of the principal problems is that of coming out with a fixed final external shape and dimension as well as with the cavity desired. Previous attempts at this have resulted in unsatisfactory outer dimensions or such excessively high press pressures as to be impractical. Another problem has arisen from the fact that the final die block must be round, square or rectangular without significant draft on the forging. The result was that it was generally conceded by the industry that die blanks could not be forged.

I have discovered a method and apparatus for hot forging die blanks to proximate final shape including a cavity and an integral die shank which overcomes the forging problems and which, for the first time in this art, makes it possible to forge a die block to its proximate ultimate useable shape.

I have found that a forged die blank having a shank and cavity can be formed in a closed die using an open die press by taking a forging blank whose dimensions are such that its movement transverse to the axis of press movement is completed after all work in the direction of press movement has been completed so that the workpiece does not engage the periphery of the die until the cavity has been formed. I have found that in order to form the desired peripheral configuration, I use a closed forging die having an outer sleeve movable relatively to the die face so that on completion of the forging operation, the sleeve is held and the forged blank pushed from the sleeve by the press itself. Preferably, I place the tool on the bottom platen of a press, surrounded by the sleeve forming the outer periphery of the closed die and press or push the heated piece to be forged onto the tool causing the material to flow over the tool. This practice is not, however, critical for I have also made blanks by placing the tool on the upper platen and pressing it downwardly into the sleeve surrounding the piece to form the forging blank.

In a preferred practice of my invention, I form a blank having a volume equal to the final volume of the finished forged die block and dimensions such that during pressing all work in the direction of pressing is substantially completed before the movement transverse to the direction of press movement is completed, heating the blank to forging temperature, placing the blank in a closed die, pressing the blank to form a desired cavity therein, thereafter further pressing the blank to cause it to move in a direction transverse to the movement of the press to engage the side walls of the die and removing the completed forged die blocks from the die. Preferably, the side walls of the die are in the form of a sleeve surrounding and movable relatively to the die tool and the die tool is attached to the bottom platen of a press.

I have found that in some instances the final forged block is difficult to remove and tends to hang on the die tool. In order to overcome this I provide a plurality of passages in the tool adapted to receive pins for pushing the block from the tool after the forming operation is completed. I simply insert pins in the tool passage and press the block from the tool.

In the foregoing general description, I have set out certain objects, purposes and advantages of my invention. Other objects, purposes and advantages of the invention will be apparent, however, from a consideration of the following description and the accompanying drawings in which:

FIG. 1 is an isometric view of a rectangular forging blank cut from a piece of steel to dimensions for use in my process;

FIGS. 2 through 4 are sections through an isometric view of a die and sleeve forming a closed die according to my invention and illustrating the successive steps;

FIG. 5 is an isometric view of a holder made by the use of the invention;

FIG. 6 is an isometric view of a round forging blank cut from a piece of steel to dimensions for use in my process;

FIGS. 7 through 9 are sections through a die and sleeve forming a closed die according to my invention for receiving the blank of FIG. 6;

FIG. 10 is a section through the finished forging die block made in the die of FIGS. 7–9;

Figure 11:
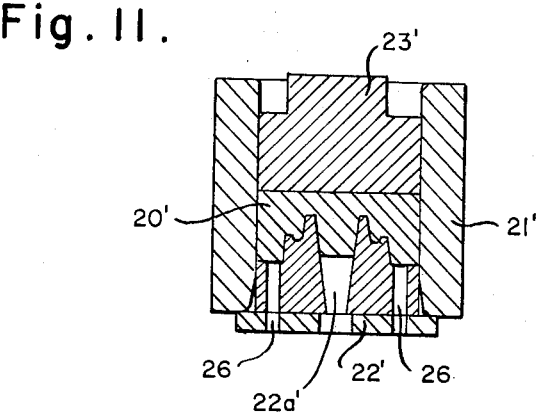
FIG. 11 is a second embodiment of the die of FIGS. 7–10.

Referring to the drawings and particularly to FIGS. 1 through 5, I have illustrated a forging blank 10 of rectangular section and a closed die formed of an outer sleeve 11, a bottom die plate 12 and a top die plate 13.

It will be noted from the drawings that there is a clearance 14 between the sides of blank 10 and sleeve 11. This is an essential part of the present invention. This clearance must be such that when the work done to complete the formation of shank 10a and groove 10b has ceased, the blank is still not engaged with the sidewalls of sleeve 11 as shown in chain line in FIG. 4. Further pressure expands the blank transverse to the line of press motion to expand the blank sidewise ot fill the sleeve. The completed blank is removed by raising sleeve 11 clear of bottom die 12, holding the sleeve and pushing the blank 10 from the sleeve. This makes it possible to form a finished forging die blank without draft and thereby overcome one of the serious problems of prior art practices.

In the modification illustrated in FIGS. 6 through 10, I have illustrated a forging blank 20 of round section and a closed die formed of an outer sleeve 21, a bottom die tool 22 and a top die tool 23. The bottom die tool has a central axial cavity 22a open through the bottom of the die. I prefer to use an opening through the bottom die in those instances where I wish to permit the steel of blank 20 to enter the cavity with the minimum of resistance and the maximum detail.

In this embodiment, the blank 20 is heated to forging temperature and placed on top of bottom die 22 within sleeve 21 with clearance 24 around the periphery of blank 20. The top tool 23 is brought onto the blank 20 and pressure applied to force the blank 20 over bottom die 22. The steel flows over die 22 and when the countour is substantially completely formed, moves sidewise transverse to the press movement to contact the sides of sleeve 21. Again the finished piece 25 is removed by raising sleeve 21 from tool 22 and forcing the finished blank 25 out of the sleeve.

In order to complete the die blank 25 for use, the customer need only remove by machining that portion of the blank outside the chain line in FIG. 10 instead of the entire cavity portion as was past practice. The large saving in time and material will be evident from this example. In addition, however, heat treatment following forging gives a uniform die even after machining along with uniform grain pattern around the entire blank. Neither of these conditions were obtained by the prior art practices.

Figure 12:
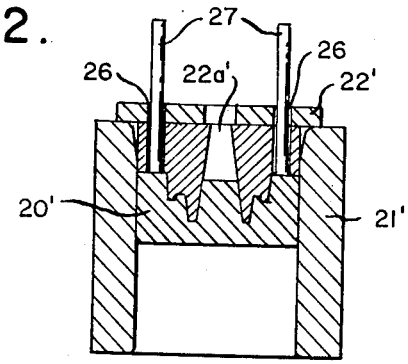
FIG. 12 is a section through a finished forging and die block using the embodiment of FIG. 11 showing pusher pins.

In the embodiment illustrated in FIGS. 11 and 12 I have illustrated a die and sleeve for receiving the blank of FIG. 6 and being identical to the die and sleeve of FIGS. 7–9 except for the inclusion of four cylindrical passages 26 parallel to the walls of sleeve 21. All other parts bear the same numerals as FIGS. 7 and 9 with the addition of a prime sign. I have found that the addition of these passages does not detrimentally affect the final forging and by inserting cylindrical pins 27 into the holes after turning the sleeve over the die block 20 can be easily pushed from die 22 (FIG. 12).

While I have illustrated and described certain preferred practices and embodiments of my invention in the foregoing specification, it will be understood that this invention may otherwise be embodied within the scope of the following claims.

I claim:
1. A method of forming a forging die blank comprising the steps of:
    (a) forming a blank having a volume equal to the finished forged blank and dimensions such that the outer periphery is smaller than that of the finished article in the direction transverse to forging.
    (b) heating the blank to forging temperature,
    (c) placing the blank in a closed die,
    (d) pressing the blank to form completely a desired tool face thereon without causing the blank to engage the sidewalls of the die,
    (e) further pressing the blank to cause it to move transverse to the direction of pressing to engage the sidewalls of the die, and
    (f) removing the completed forging from the die.

2. The method as claimed in claim 1 wherein the blank is placed in a closed die having an outer sleeve movable relative to the die tool and the forging is removed by raising the sleeve from the tool and applying pressure on the forging.

3. The method as claimed in claim 1 wherein the die is provided with passages parallel to the sidewalls of the die and the forging is removed by inserting pins therein and pushing the forging from the die.

References Cited

UNITED STATES PATENTS

| | | |
|---|---|---|
| 1,632,533 | 6/1927 | Brauchler. |
| 2,515,589 | 7/1950 | Brauchler _____ 76—107 |
| 2,524,057 | 10/1950 | Jungersen et al _____ 76—107 XR |
| 2,822,708 | 2/1958 | Nelson _____ 76—107 |

BERNARD STICKNEY, Primary Examiner

U.S. Cl. X.R.

29—156; 72—372